(12) United States Patent
Yoakim et al.

(10) Patent No.: US 8,202,560 B2
(45) Date of Patent: *Jun. 19, 2012

(54) SYSTEM WITH CAPSULE HAVING SEALING MEANS

(75) Inventors: Alfred Yoakim, St-Legier-la Chiesaz (CH); Gilles Gavillet, Ursy FR (CH); Jean-Paul Denisart, La Conversion (CH)

(73) Assignee: Nestec S.A., Vevey (CH)

( * ) Notice: Subject to any disclaimer, the term of this patent is extended or adjusted under 35 U.S.C. 154(b) by 287 days.

This patent is subject to a terminal disclaimer.

(21) Appl. No.: 11/737,560

(22) Filed: Apr. 19, 2007

(65) Prior Publication Data

US 2007/0224319 A1  Sep. 27, 2007

Related U.S. Application Data

(63) Continuation of application No. PCT/EP2005/011259, filed on Oct. 19, 2005.

(30) Foreign Application Priority Data

Oct. 25, 2004 (EP) .................................... 04025320

(51) Int. Cl.
*A23L 1/28* (2006.01)
*A47J 31/06* (2006.01)
(52) U.S. Cl. ............ 426/431; 99/295; 426/77; 426/432; 426/433
(58) Field of Classification Search .............. 426/77–79, 426/431–433; 99/295
See application file for complete search history.

(56) References Cited

U.S. PATENT DOCUMENTS

| | | | |
|---|---|---|---|
| 2,451,195 A | 10/1948 | Brown | 99/295 |
| 3,445,237 A | 5/1969 | Gidge | 99/77.1 |
| 4,136,202 A | 1/1979 | Favre | 426/77 |
| 4,254,694 A | 3/1981 | Illy | 99/295 |
| 4,429,623 A | 2/1984 | Illy | 99/295 |
| 4,471,689 A | 9/1984 | Piana | 99/295 |
| 5,008,013 A | 4/1991 | Favre et al. | 210/482 |
| 5,072,661 A | 12/1991 | Kondo | 99/296 |
| 5,108,768 A | 4/1992 | So | 426/77 |

(Continued)

FOREIGN PATENT DOCUMENTS

AU  51 220/73  7/1974

(Continued)

OTHER PUBLICATIONS

Notice of Opposition to European patent No. 1 816 935 dated Oct. 7, 2009.

(Continued)

*Primary Examiner* — Drew Becker
*Assistant Examiner* — Luana Z Long

(57) ABSTRACT

A beverage forming system that includes a capsule for containing beverage ingredients and having an outer surface; a capsule-based beverage producing device provided with a member for injecting a liquid under pressure into the capsule, a member for draining a beverage from the capsule, and an enclosing member transferable from an opened state to a defined closed state, in which the enclosing member encloses the outer surface of the capsule; and a sealing member associated with the capsule and which is compressible when engaged by the enclosing member in the closed state, wherein the sealing member is effective to compensate for the clearance between the enclosing member and the capsule which would otherwise exist when the enclosing member is in its defined closed state. Also, a method for producing a beverage using such a system.

21 Claims, 14 Drawing Sheets

U.S. PATENT DOCUMENTS

| | | | |
|---|---|---|---|
| 5,197,374 A | 3/1993 | Fond | 99/295 |
| 5,242,702 A | 9/1993 | Fond | 99/295 |
| 5,327,815 A | 7/1994 | Fond et al. | 99/295 |
| 5,398,595 A | 3/1995 | Fond et al. | 99/295 |
| 5,402,707 A * | 4/1995 | Fond et al. | 99/295 |
| 5,472,719 A | 12/1995 | Favre et al. | 426/77 |
| 5,649,472 A | 7/1997 | Fond et al. | 99/295 |
| 5,656,316 A | 8/1997 | Fond et al. | 426/333 |
| 5,897,899 A | 4/1999 | Fond | 426/112 |
| 6,026,732 A | 2/2000 | Kollep et al. | 99/295 |
| 6,832,542 B2 | 12/2004 | Hu et al. | 99/302 R |
| 6,955,116 B2 | 10/2005 | Hale | 99/295 |
| 7,640,842 B2 | 1/2010 | Bardazzi | 99/295 |
| 7,926,415 B2 | 4/2011 | Yoakim et al. | 426/77 |
| 7,993,691 B2 | 8/2011 | Yoakim et al. | 99/295 |
| 2001/0052294 A1* | 12/2001 | Schmed | 99/295 |
| 2002/0015768 A1 | 2/2002 | Masek et al. | 426/115 |
| 2002/0121198 A1 | 9/2002 | Kollep et al. | 99/279 |
| 2003/0089245 A1 | 5/2003 | Kollep et al. | 99/495 |
| 2003/0217643 A1 | 11/2003 | Masek et al. | 99/279 |
| 2004/0191371 A1 | 9/2004 | Halliday et al. | 426/112 |
| 2004/0206245 A1 | 10/2004 | Halliday et al. | 99/337 |
| 2004/0228955 A1 | 11/2004 | Denisart | 426/590 |
| 2004/0231521 A1 | 11/2004 | Yoakim | 99/275 |
| 2005/0206245 A1 | 9/2005 | Yoshida | 310/12 |
| 2005/0235834 A1 | 10/2005 | Blanc et al. | 99/295 |
| 2006/0110507 A1 | 5/2006 | Yoakim et al. | 426/433 |
| 2007/0104837 A1 | 5/2007 | Yoakim | 426/77 |
| 2007/0202237 A1 | 8/2007 | Yoakim et al. | 426/590 |
| 2009/0017177 A1 | 1/2009 | Yoakim et al. | 426/432 |
| 2009/0280219 A1 | 11/2009 | Yoakim et al. | 426/433 |

FOREIGN PATENT DOCUMENTS

| | | | |
|---|---|---|---|
| CA | 2 067 515 | | 11/1992 |
| CH | 503 630 A | | 4/1971 |
| DE | 938 984 | | 1/1956 |
| DE | 14 29 932 A1 | | 6/1969 |
| DE | 35 04 441 A1 | | 8/1986 |
| EP | 0 361 569 | | 4/1990 |
| EP | 0 468 080 | | 1/1992 |
| EP | 0 468 080 A1 | | 1/1992 |
| EP | 0468079 | | 1/1992 |
| EP | 0 512 468 | | 11/1992 |
| EP | 0512470 | | 11/1992 |
| EP | 0604615 | | 7/1994 |
| EP | 0 710 462 A1 | | 5/1996 |
| EP | 171 0 462 | | 10/1996 |
| EP | 1 090 574 B1 | | 4/2001 |
| EP | 1 101 430 | | 5/2001 |
| EP | 1 203 544 A1 | | 5/2002 |
| EP | 1 327 407 A2 | | 7/2003 |
| EP | 1 344 724 | | 5/2006 |
| EP | 1 654 966 A1 | | 5/2006 |
| FR | 2 041 380 | | 1/1971 |
| FR | 2 093 111 | | 1/1972 |
| FR | 2 160 634 A1 | | 6/1973 |
| FR | 2 213 757 A1 | | 8/1974 |
| FR | 2617389 | * | 1/1989 |
| GB | 899055 A | | 6/1962 |
| JP | 5-192246 A | | 8/1993 |
| JP | 5-199937 A | | 8/1993 |
| RU | 2311109 | | 11/2007 |
| WO | WO 93/17932 A1 | | 9/1993 |
| WO | WO 94/02059 A1 | | 2/1994 |
| WO | WO 95/10724 | | 4/1995 |
| WO | WO 02/43541 | | 6/2002 |
| WO | WO 03/059778 | | 7/2003 |
| WO | WO 2004/071259 | | 8/2004 |
| WO | WO 2005/004683 | | 1/2005 |
| WO | WO 2006/045537 A1 | | 5/2006 |

OTHER PUBLICATIONS

Notice of Opposition to European patent No. 1 700 548 dated May 8, 2008.
Copending U.S. Appl. No. 11/258,433, filed Oct. 25, 2005 and office Actions therein.
Restriction Requirement dated Feb. 3, 2010 for U.S. Appl. No. 11/737,334.
Non-Final Office Action dated Apr. 9, 2010 for U.S. Appl. No. 11/737,334.
Final Office Action dated Aug. 18, 2010 for U.S. Appl. No. 11/737,334.
Non-Final Office Action dated Sep. 10, 2010 for U.S. Appl. No. 11/258,433.
Advisory Action dated Jun. 4, 2010 for U.S. Appl. No. 11/258,433.
Non-Final Office Action dated Aug. 7, 2009 for U.S. Appl. No. 11/258,433.
Restriction Requirement dated Apr. 2, 2009 for U.S. Appl. No. 11/258,433.
Final Office Action dated Mar. 25, 2010 for U.S. Appl. No. 11/258,433.
Notice of Allowance mailed Jan. 10, 2011 for U.S. Appl. No. 11/258,433, filed Oct. 25, 2005.
Notice of Allowance mailed Apr. 6, 2011 for U.S. Appl. No. 11/258,433, filed Oct. 25, 2005.
Notice of Allowance mailed Mar. 22, 2011 for U.S. Appl. No. 11/737,334, filed Apr. 19, 2007.
International Search Report and Written Opinion mailed Dec. 23, 2005, Application No. PCT/EP2005/011306 filed Oct. 20, 2005.
International Search Report and Written Opinion mailed Dec. 23, 2005, Application No. PCT/EP2007/052613 filed Oct. 23, 2007.

* cited by examiner

SYSTEM WITH CAPSULE HAVING SEALING MEANS

CROSS-REFERENCE TO RELATED APPLICATIONS

This application is a continuation of International application PCT/EP2005/011259 filed Oct. 19, 2005, the entire content of which is expressly incorporated herein by reference thereto.

BACKGROUND

The present invention generally relates to capsules for containing beverage-forming ingredients, a beverage producing system for use in connection with such capsules as well as to methods for producing beverages using such capsules.

The background of the present invention is the field of capsules which are adapted to contain beverage or other comestible (e.g., soup) ingredients. By means of an interaction of these ingredients with a liquid, a beverage or other comestibles, such as for example soups, can be produced. The interaction can be for example an extraction, brewing, dissolution, etc. process. Such a capsule is particularly suited to contain ground coffee in order to produce a coffee beverage by having hot water under pressure enter the capsule and draining a coffee beverage from the capsule.

A capsule as shown in Australian patent application 51,220/73 relates to an apparatus for making coffee beverage from a cartridge in which a water injection device is placed hermetically against the upper side of the cartridge. The water injection device includes a seal which is applied on the upper rim of the capsule.

EP 0361569 A1 does not show a sealed capsule, but instead discloses a coffee filter unit which is not sealed when placed into the coffee machine but is simply press fitted in a cartridge casing, such that water can be poured on a filter paper provided at the open upper side of the coffee filter unit. To avoid spilling of water outside the filter unit's upper rim, the peripheral portion of a filter paper is clamped between the outer rim of the coffee filter unit wall and the surrounding wall of the machine. Such a design is an device filtering a beverage at atmospheric pressure which is not adapted to withstand the typical water injection pressure of e.g., more than 3 bars or even much higher pressure which reigns in the capsule when e.g. an espresso-style coffee is to be produced.

FR 2617389 describes a capsule-based coffee machine in which a capsule to be extracted is placed on a capsule holder. The capsule holder is then rotated bayonet-like, wherein the final rotational position depends on the torque which the user applies on a handle for rotating the capsule holder. The machine itself does therefore not have a defined closure position since the final closure position depends on the amount of torque applied by the user. The sealing between the capsule and the machine is therefore not defined by the design of the machine, but arbitrarily depends on the user's handling of the machine. Typically, the higher the rotational force exerted, the more clearance can be compensated. However, such system provides several drawbacks. First of all, it requires the closing device to remain purely tightened by hand and it cannot be otherwise mechanically, electrically or hydraulically assisted. It requires a certain strength to screw the capsule holder on the machine from the user and the user may have difficulties to unscrew the capsule holder afterwards. Furthermore, the sealing is difficult to control and it may be that the capsule holder is insufficiently tightened so that pressure leakage can occur.

In contrast to the rotational bayonet-style closing according to FR 2617389, the present invention relates to machines in which the closure of the parts of the machine which surround the capsule and thus also the sealing is not an arbitrary function of the user's force, but a defined state which depends on the arrangement of the capsule in the machine. This is, for example, the case in machines in which the final phase of the closure movement is essentially an axial (i.e., translational or a curvilinear) but non-rotational movement.

The systems and methods for obtaining fluid comestibles from substances containing capsules are for example known from U.S. Pat. No. 5,402,707. The capsule 101 as shown therein in FIG. 1 has a frustroconically-shaped cup 102 which may be filled e.g. with roasted and ground coffee 103 and which is closed by a foil-like tear face cover 104 welded and/or crimped to a flange-like rim which extends laterally from the side-wall of cup 102. A capsule holder 111 comprises a flow grill 112 with relief surface element members 113 and an annular chamfered rim 114. The capsule holder 111 is accommodated in its support 115 which has a lateral wall 124, and a bore 127 for the passage of extracted coffee beverage.

As can be seen from FIG. 1, the extraction system further comprises a water injector 107 having a water inlet channel 120 and an annular element 108 with an internal recess of which the shape substantially corresponds to the outer shape of the capsule. On its outer part, the bell member 108 comprises a spring 122 holding a ring 123 for releasing the capsule on completion of extraction.

In operation, a capsule 101 is placed in the capsule holder 111. The water injector 107 perforates the upper face of the cup 102. The lower tear face 104 of the capsule rests on the radially arranged members 113 of the capsule holder 111. The water is injected through the channel 120 of the water injector 107 and impinges on the bed 103 of coffee. The pressure in the capsule 101 increases and the tear face 104 increasingly follows the shape of the radial opening relief members 113. When the constituent material of the tear face reaches its breaking stress, the tear face tears along the relief members. The extracted coffee flows through the orifices of the flow grill 112 and is recovered in a container (not shown) beneath the bore 127.

The principles of this extraction process as far as it can be maintained in connection with the present invention can be summarized as follows:

a sealed capsule is inserted in capsule holder;

the capsule holder is then associated with a water injection portion of the machine such that an annular element (108 in FIG. 4) surrounds the capsule;

in a first wall of the capsule at least one opening is generated, and water entering the capsule through the opening in the first wall is interacting with the ingredients in the interior of the capsule and the thus produced beverage is then drained from at least a second opening is created in the second wall.

The ingredients in the capsule constitute the "bottleneck" of the flow path of the water and will therefore cause a pressure drop between the upstream and the downstream side of the liquid flow through the capsule, which pressure drop will even increase during the interaction between the liquid and the ingredients for example due to a swelling of the ingredients. Correspondingly it has to be assured that the only water flow is actually taking place through the interior of the capsule (arrow A1) and that no water can flow from the water injector into the interstice between the annular enclosing member 108 and the exterior of the capsule 101 and then to the draining bore 127 of the device. The arrow A2 illustrates this undesired external water flow path. With other words, any water flow exterior to the capsule 101 has to be stopped (or at least hindered to a substantial degree) by a sealing engagement being positioned in the interstice between the annular member 108 and the capsule 101 and in the flow path between the water injector and the beverage-draining bore. In the prior art embodiment shown in FIG. 1 such sealing engagement can be achieved by the pinching engagement between the annular member 108, the flange-like rim of the side wall of the capsule 101 and the capsule holder.

In case the sealing engagement is not working properly and water is flowing outside the capsule, no pressure sufficient to cause the tearing of the tear face will be built up inside the capsule, or alternatively, a too low pressure will be causing partial tearing of the tear face and therefore only a poor extraction of the substance, consequently, leading to the delivery of a low quality beverage. In such a scenario water will be drained from the beverage production device without having interacted or fully interacted under sufficient pressure conditions with the ingredients contained in the capsule.

New machines are now commercially available which are based on an axial closure movement and no longer on a bayonet-style closure. These machines provides more user convenience, they can be mechanically, electrically or hydraulically assisted for an easier closing and they can be made of less expensive materials (such as plastic). For instance, a few patents describe different closure principles such as in EP 0604615, EP 1090574; EP 1327407; WO 2004/071259 or WO 2005/004683.

Therefore, there is no possibility for the user to control the degree of tightening of the closure about the capsule. As long as the intrinsically defined closed state, of the devices working on an axial closure movement, is working properly, this leads to satisfying results. If, however, the seal has been damaged or its efficiency has decreased over time for different reasons (such as due to wear, ageing, obstruction by solid residue, etc.) or also, in the event, the closed position is misaligned (e.g., horizontally offset vis-a-vis the ideal closure position due to wear, fatigue or manufacturing tolerances), there is the risk of having no tight sealing or even having an undesirable clearance between the enclosing member and the capsule.

According to the prior art, sealing engagement is accomplished by lining the inner wall and/or pressing edge of the capsule cage with a rubber-elastic joint. In other words, according to the prior art approach, the sealing engagement is assured by a permanent structure which is fixed to or attached to the beverage-producing device. This has the disadvantage that after intensive use (i.e., over a high number of extraction cycles), a wearing off of the permanent seal can take place such that the extraction conditions of the beverage may deteriorate and quality of the beverage accordingly negatively affected.

In particular, any "leak" at the exterior of the capsule reduces the pressure inside the capsule. On the other hand, a sufficient extraction pressure is a key factor for the quality of espresso-style coffee. Thus, improvements in these type devices are desired.

SUMMARY OF THE INVENTION

The present invention correspondingly aims at an improvement of such beverage producing systems which comprises:
a capsule containing beverage ingredients and having a center axis and an outer surface;
a capsule-based beverage producing device provided with a member for injecting a liquid under pressure into the capsule, a member for draining a beverage from the capsule, and an enclosing member that is movable from an opened state to a defined closed state, in which the enclosing member encloses the outer surface of the capsule; and
a sealing member associated with the capsule and which is compressible when engaged by the enclosing member in the closed state, wherein the sealing member is effective to provide a sealing engagement that compensates for clearances between the enclosing member and the capsule which would otherwise exist when the enclosing member is in its defined closed state such that the sealing member assures that the liquid can only flow through the capsule and in contact with the beverage ingredients to form a liquid beverage.

The invention also relates to a method for producing a beverage, which comprises:
positioning a capsule containing beverage ingredients in a beverage production device which includes an enclosing member in an open state to receive the capsule, wherein the capsule includes a sealing member that is compressible,
moving the enclosing member of the device from the open state to a defined closed state, while in the final phase of movement of the enclosing member engages and bias the sealing means of the capsule, with the sealing member providing a sealing engagement that compensates for clearances between the enclosing member and the capsule which would otherwise exist when the enclosing member is in the closed state; and
injecting a liquid under pressure into the capsule through at least one opening in a first wall member and having the liquid leave the capsule through at least one opening in a second wall member, such that the sealing member assures that the liquid can only flow through the capsule and in contact with the beverage ingredients to form a liquid beverage.

BRIEF DESCRIPTION OF THE DRAWINGS

Further advantages, features and objects of the present invention will become evident for the skilled artisan when reading the following detailed description of embodiments of the present invention taking in conjunction with the figures of the enclosed drawings.

DETAILED DESCRIPTION OF THE PREFERRED EMBODIMENTS

Figure 1:
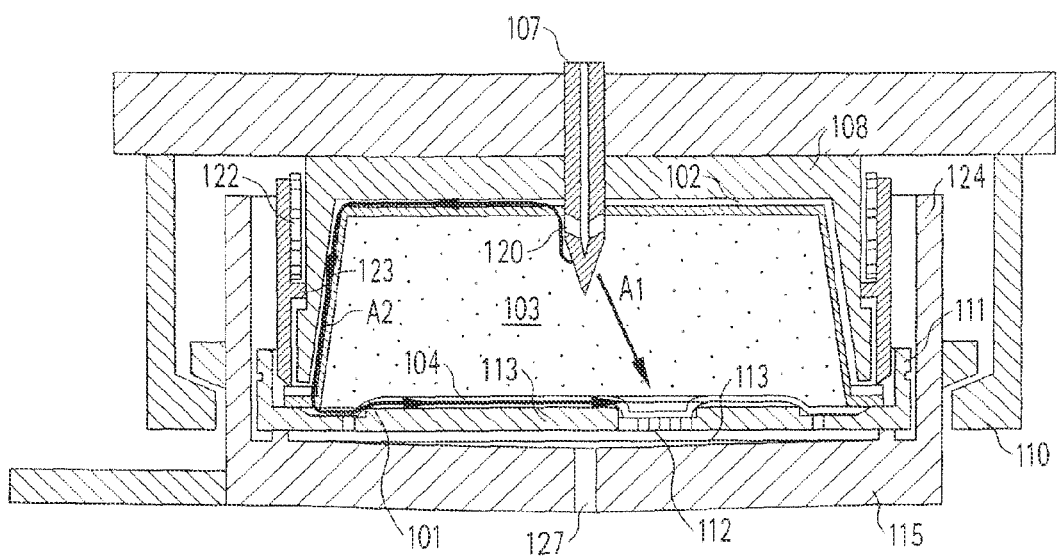
FIG. 1 shows an extraction capsule known from U.S. Pat. No. 5,402,707.

The invention particularly aims at an improvement of a compensatory sealing engagement between the enclosing member and the outer surface of the capsule. Note that the present invention thus especially aims at an improvement of capsules such as are currently used in state-of-the-art beverage production devices with built-in sealing member such as for example those shown in U.S. Pat. No. 5,402,707, the entire content of which is expressly incorporated herein by reference thereto.

A sealing member is associated with the capsule and is compressible when engaged by the enclosing member in the closed state such that the sealing member is effective to compensate for the clearance that would otherwise exist between the enclosing member and the capsule when the enclosing member is in its defined closed position. The sealing member can be resilient under compression and be engaged by the enclosing member in the closed state.

The enclosing member can be arranged such that in the final phase of its transfer movement form its opened state to its closed state, it carries out an essentially axial (e.g., linear or curvilinear but non-rotational) relative movement with regard to the capsule without a relative rotation of the capsule. The enclosing member also can be arranged with regard to the capsule such that during the transfer movement from the opened state to the closed state, the capsule essentially stays in place.

The sealing member is preferably arranged to exert a biasing force against a matching pressing surface of the beverage production device. Thus, the sealing member is of sufficient thickness to compensate within a certain range of variation of clearance. Preferably, the sealing member has a thickness (at rest), as measured in the main direction of the compressive forces of from 0.5 and 5 mm, preferably of from 1 and 3 mm.

The pressing surface is comprised has a linear and/or frustroconical contour when seen in a radial section view. The pressing surface can present a non-linear contour when seen in a side view. If desired, the contour of the pressing surface can be provided with corrugations.

The sealing engagement thereby can be designed to be only effective as long as the enclosing member exerts a minimum compressive force on the capsule, but is automatically released as soon as the compressive force falls below this minimum compressive force. Grooves can be provided in the circumference of the enclosing member, which grooves act as air inlet passages for feeding air through these grooves and through the released sealing engagement between the capsule and the enclosing member. The preferred sealing member is a rubber-elastic material. Also, the sealing member can be made from the constituent material of the capsule such as a polymeric material.

The capsule comprises a first and a second wall element being connected with each other in an airtight fashion in a flange-like rim area in order to create a sealed interior for the ingredients. In this embodiment, the sealing member can be provided at least in the transition area of the flange-like rim and one of the wall elements. The sealing member can also be provided on a wall between the flange-like rim and the location on the capsule where the water injector is introduced. The capsule can be comprised of a cup-like base body and an enclosing member. The sealing member can be present both on the flange-like rim and a portion of a side wall of the base body.

The sealing member can be an integral part of one of the wall elements, or it can be separate to the wall elements. The sealing member has the shape of an O-ring or a ring having a L-shaped cross-section. The sealing member can be attached to one of the wall elements using an adhesive or by welding or by pinching or crimping or a combination thereof.

The enclosing member can comprise an additional sealing member adapted to assist to the sealing engagement between the enclosing member and the capsule. The sealing pressure acting at the sealing engagement can have a radial an/or axial component relative to the center axis of the capsule.

The sealing member of the capsule can generally compensate any clearance between the enclosing member and the capsule when the enclosing member is in its defined closed state, which clearance would exist without the compensatory effect of the sealing member of the capsule. In the final phase of the transfer movement the enclosing member can at least partially compress the sealing member of the capsule to provide a sealing engagement that can withstand an internal pressure in the range of 2 to 20 bars, preferably 4 to 15 bars.

The term "matching pressing surface" as used herein is typically a portion of the beverage production device. This can be a surface of the enclosing member which is typically one part of the device which covers at least one side of the capsule upon closing of the device to encompass the capsule. The term "internal pressure" refers to the relative pressure above ambient atmospheric pressure that can be measured in the fluid conduit of the fluid injection device just before the fluid inlet in capsule (but downstream of any non-return valve) during extraction.

Figure 2:
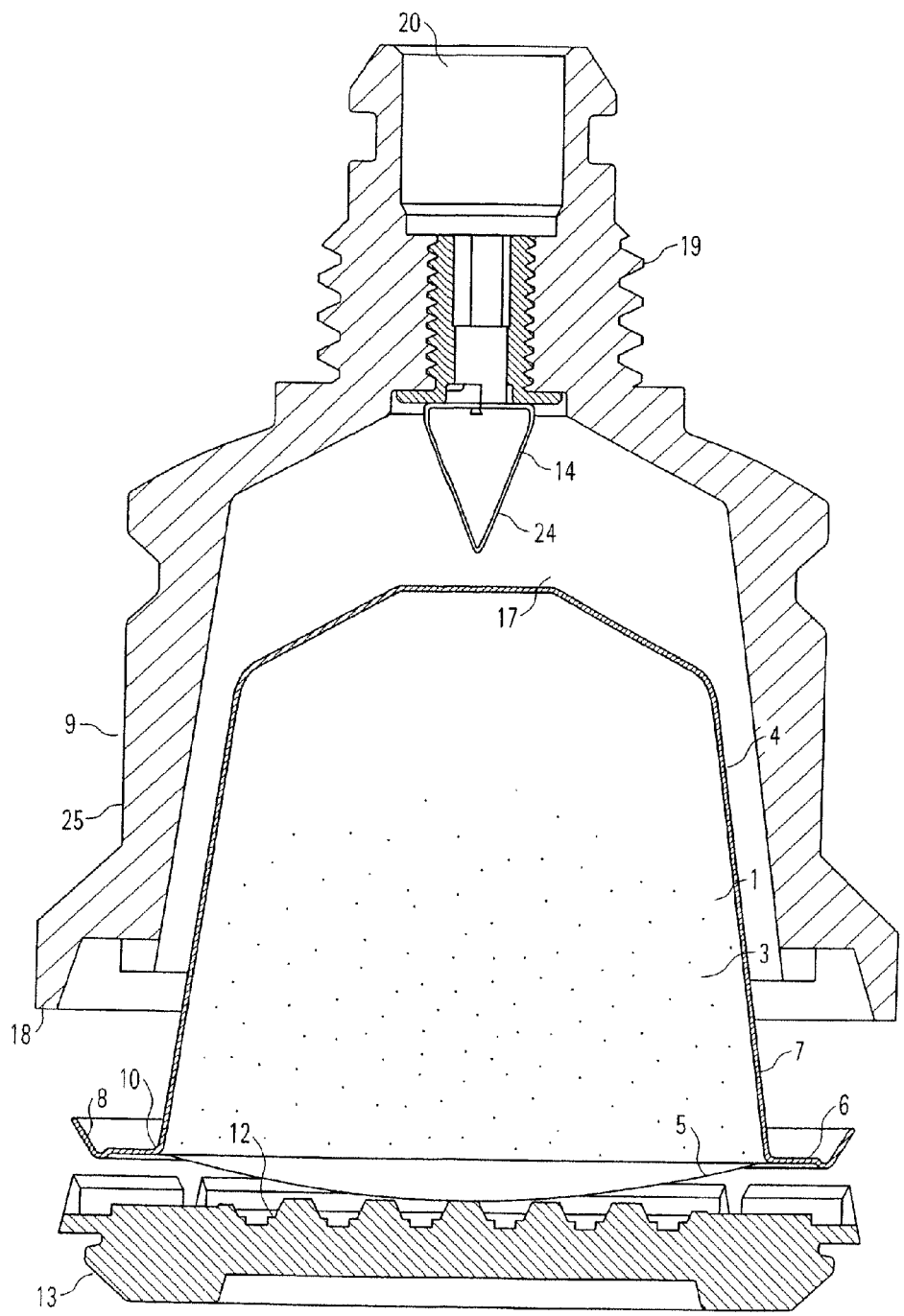
FIG. 2 shows a first embodiment of the present invention in which a capsule is placed on the capsule holder but has not yet reached its closing position in the beverage production device.

With reference to FIG. 2 now a first detailed embodiment will be explained. Note that in the following the invention will be explained referring to a certain design of a capsule, i.e., a design according to which the capsule comprises a cup-like base body and a closing foil member. However, it is to be understood than other designs of the capsule are viable, such as e.g. capsules having a lenticular form with two essentially matching and opposing walls (e.g., foils) being sealed at the e.g., ring-shaped edge. Generally a capsule according to the present invention comprises at least two opposing wall members which are connected to each other at the edges to form a sealed flange-like rim area, thus enclosing a sealed interior. These capsules are inserted into the beverage production device while still being sealed.

Comparable to the prior art also this embodiment shows a capsule holder 13 having relief elements 12 which are designed to tear and perforate a foil member 5 closing off a cup-like base body 4 of the capsule 1. Note that other tearing elements than the relief elements can be thought of. This tearing of the foil member can e.g. occur as soon as the pressure inside the capsule exceeds a threshold value. Note that the relief elements can have any protruding shape able to cause a (partial) tearing of the foil member. As an example only pyramids, needles, bumps, cylinders, elongated ribs are cited. In an alternative, the foil member 5 could be replaced by a wall that can be pierced against at least one relief element before water is injected in the capsule, for instance, as resulting of the closure of the machine about the capsule.

Within the capsule 1 ingredients 3 are contained, wherein the ingredients 3 are selected such that a beverage can be produced when having a liquid entering the capsule in the region of the top wall 17 of the capsule 1 and then interact which such ingredients 3. Preferred ingredients are e.g.

ground coffee, tea or any other ingredients from which a beverage or other liquid or viscous comestible (e.g. soup) can be produced.

FIG. 2 shows a state in which such a capsule has been placed (while still being sealed) on a capsule holder 13, the foil member 5 resting on the relief element 12 side of the capsule holder 13 and the cup-like base body 4 of the capsule 1 being already partly surrounded by the circumferential wall 25 of an enclosing member 9 of the beverage production device. The shown enclosing member has the shape of a bell. Other shapes are viable, wherein the design of the interior contours (recess) of the enclosing member is generally adapted to substantially match the contours of the capsule 1. Note that the foil member 5 as shown is not exactly flat due to a defined over pressure inside the capsule, which over pressure is generated by introducing e.g. a protective gas when producing the filled capsule.

The enclosing (bell) member 9 furthermore comprises an annular support skirt 18, the function of which will be explained later, an external thread 19 for mounting the bell member in a beverage production device and a water inlet opening 20 for feeding a liquid such as for example hot water under pressure to a water injector 14 which is releasable mounted (screwed) to the bell member 9. Note that the thread 19 is just an example for a connection member, be it a releasable or permanent connection member.

The other components of the beverage production device, such as e.g., the mechanism for displacing the bell member and eventually also the capsule holder are known from the prior art in the field of capsule-based espresso machines and need not be further explained herein.

The water injector 14 comprises at least one perforation element (blade, pin, etc.) 24 designed to produce at least one opening in the top wall 17 of the capsule 1 when the capsule holder 13 and the bell member 9 are moved close together e.g. by a manually operated or a automatic mechanism. A channel (not shown in the drawings) traverses the water injector 14 and perforation element 24 such that water can be fed to the interior of the capsule 1 once the perforation element 24 protrudes into the interior of the capsule 1 (see FIG. 4).

The capsule 1 comprises said top wall 17, a sidewall 7 and a flange-like rim 6, wherein the foil member 5 is sealed to said flange-like rim 6 to close-off hermetically the cup-like base body 4 of the capsule 1. Again, other designs for the capsule are possible as long as the capsule can be sealed and contain the mentioned ingredients. For instance, the capsule can include one of more filters. A bottom filter can be placed in contact with the inner surface of the foil 5 and/or a top filter can be placed at least partially in contact with the inner surface of the body 4.

According to the present invention the outer surface of the capsule 1 presents a dedicated sealing member 10. The sealing member 10 can be resilient due to the material used and/or due to the geometrical shape of the sealing member 10. Further on, the sealing member 10 can be integral to the capsule 1 or a separate piece. In the latter case the sealing member can be mounted releasably to the base body 4 or fixed thereto e.g. by welding or by an adhesive.

In case the sealing member 10 is a separate piece attached to the capsule 1, it can be mounted to the capsule as one integral piece. Alternatively it can be applied in fluid or viscous form and then can be cured (e.g. polymerized) once applied onto the outer surface of the capsule, which is the case e.g., when applying silicone.

If a resilient material is used for the sealing member 10, preferably rubber-elastic materials are used. The term "rubber-elastic" means any suitable material having rubber elasticity including but not limited to elastomers, silicones, plastics, latex, balata or others. Particularly suitable materials are: EPDM (Ethylene Propylene Diene Monomer), NBR (Acrylic Nitrile Rubber), TPE (thermoplastic elastomer) or silicone rubber. These materials have particular good flex, compressive properties and can resist high temperatures without cracking. In case the material of the sealing member is the same as the one used for the capsule (e.g., a metal such as aluminum or plastics), preferably the resilient nature of the sealing member is procured by the geometrical shape of the sealing member.

In the embodiment according to FIG. 2 the sealing member 10 is resiliently deflectable due to its lip-shaped form 8. It is made from the same material as the capsule, preferably plastics. It can be an integral piece of the base body 4 of the capsule 1. The sealing member 10 in the form of a flexible free lip 8 extends from the outer edge of the flange-like rim 6 and is inclined outwards. In the shown embodiment the flexible lip is the edge of the side walls of the base body of the capsule, which edge is bent by an angle of more than about 90 degrees, preferably comprised between 95 and 175 degrees. Note that such deflectable sealing member 10 can be placed at any position onto the capsule 1 as long as the position is adapted for an exterior sealing engagement of the sealing member 8 and the enclosing member 9 between the water injector 14 and the perforations in the foil member 5. The sealing member 10 can also be provided on the region of the top wall 17 of the capsule 1 surrounding the water injector 14 when the water injector 14 is in a position protruding into the interior of the capsule 1. The sealing member 10 can also be arranged to cover different portions (bottom, side wall, flange-like rim) of the capsule.

Figure 3:
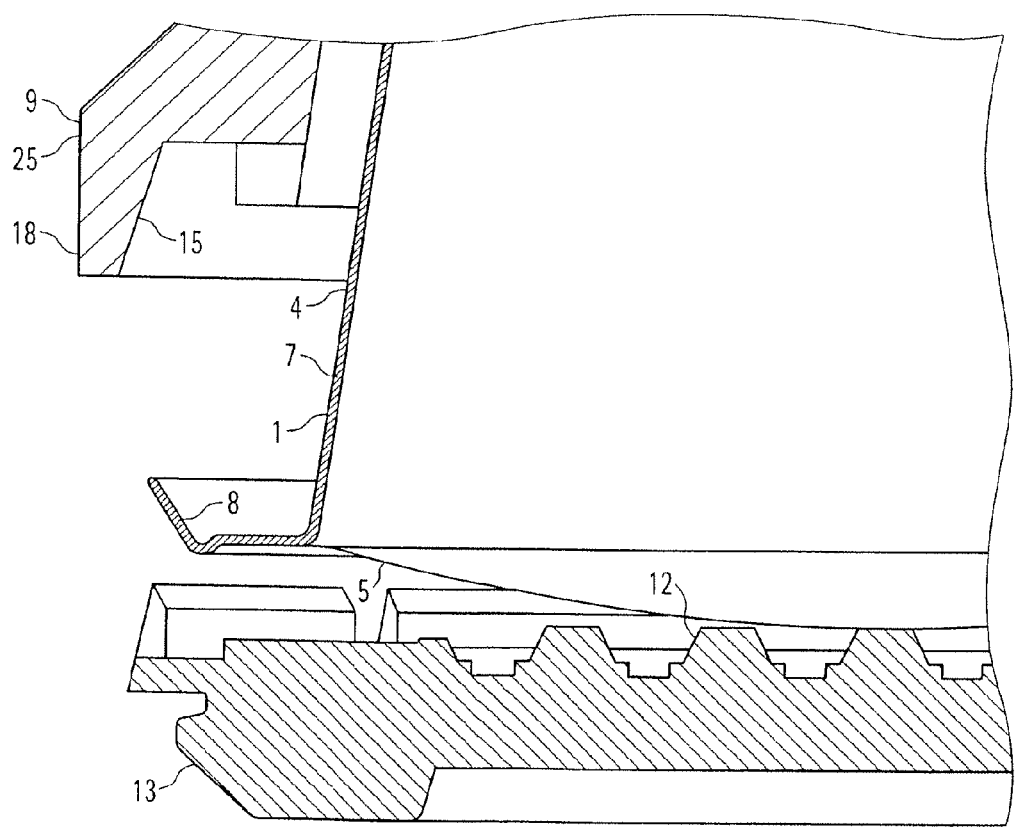
FIG. 3 shows an enlarged in view of FIG. 2.

As can be seen in detail in FIG. 3, the bell member 9 according to this embodiment does not comprise any dedicated resilient sealing member. However, the bell member optionally can also comprise an (additional) resilient sealing member. A divergently inclined sealing surface 15 of the bell member 9 is designed to cooperate with the resiliently deflectable sealing member 10 of the capsule 1. The inclination of the sealing surface is opposite to the inclination of the free flexible lip constituting the sealing member. Depending on the form and material of the sealing member 8 of the capsule 1, the cooperating surface of the bell member 9 can have any shape, position and orientation which is adapted for a sealing engagement with the sealing member 10 of the capsule 1.

Figure 4:
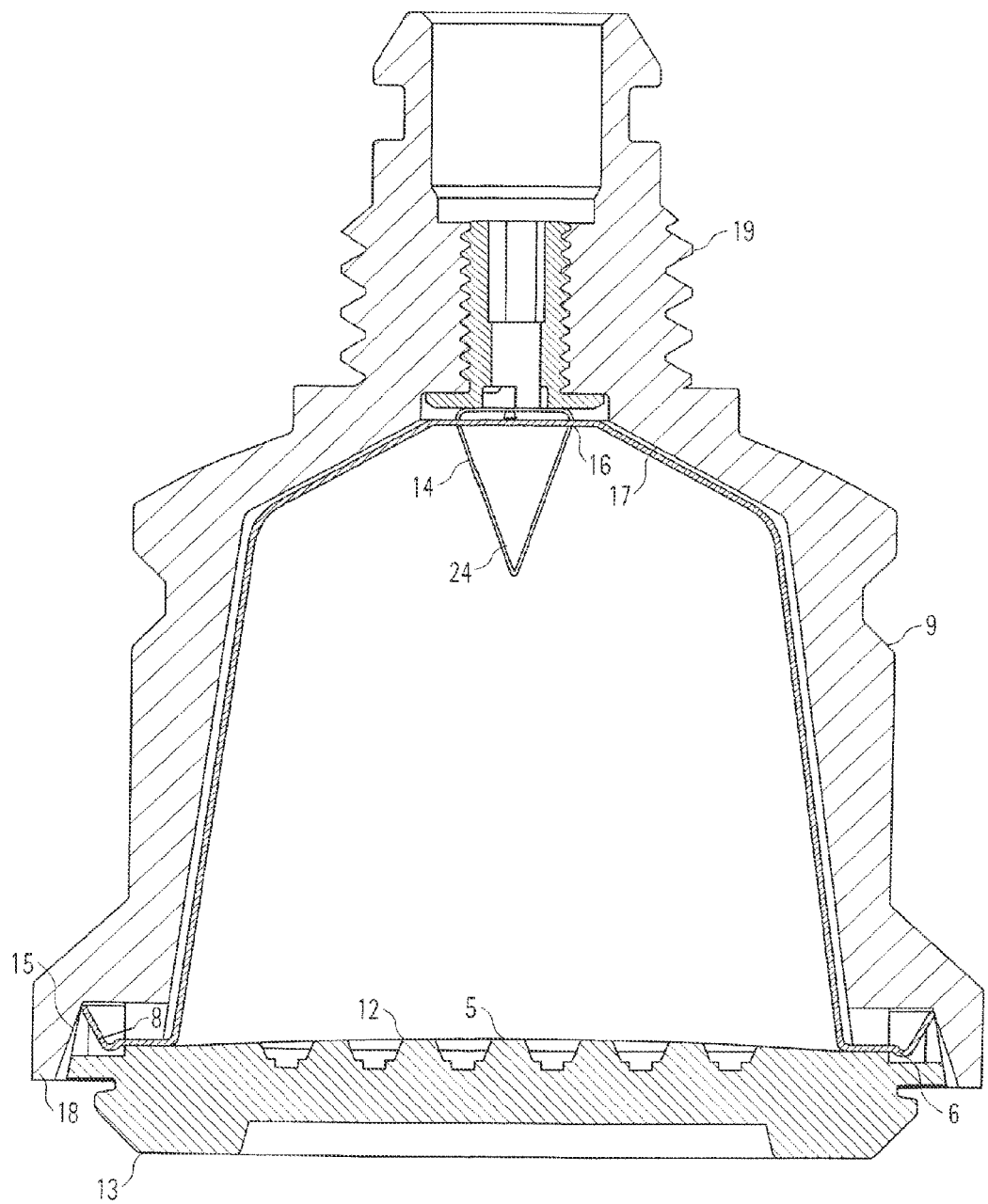
FIG. 4 shows the first embodiment in a state, in which a capsule has reached its closing position between a bell member and the capsule holder.

FIG. 4 shows the state in which the bell member 9 and the capsule holder 13 are brought in closing pressure engagement and due to the water entering the interior of the capsule and building up a pressure there the pyramidal relief members 12 of the capsule holder 13 have already produced openings in the foil member 5 of the capsule 1. The closed state shown in FIG. 4 is an intrinsically set state defined by the machine design and not by the user's manipulation.

In order to be transferred from the opened state of the enclosing member 9 shown in FIG. 2 to the closed state shown in FIG. 4, the enclosing member has undergone an essentially linear relative displacement with regard to the capsule 1. In the present embodiment it is assumed that the capsule 1 is not carrying out any displacement and stays in place during the closing process. However, alternatively or additionally to the displacement of the enclosing member 9 also the capsule 1 can carry out an essentially linear movement. In the shown example the capsule 1 does not rotate relative to the enclosing member 9.

Upon insertion of the capsule the blade element 24 of the water injector 14 has created a perforation 16 in the top wall 17 of the capsule 1. When a sufficient pressure of fluid has been built inside the capsule, the beverage produced from the ingredients contained in the capsule can be drained in small interstices between the relief members 12 and the surrounding foil member 5. In the state shown in FIG. 4 the resiliently deflectable sealing member of the capsule 1 in the form of the flexible lip 8 is biased against the corresponding inclined sealing surface 15 of the enclosing member 9. The annular support skirt 18 now covers the end of the flange-like rim 6 of the capsule 1 to ensure that the sealing member 10 and the capsule as such remain in position when the sealing surface 15 of the bell member exerts a certain pressure force on the flexible lip 8.

Actually, the lip-shaped sealing member 8, 10 represents an example of a construction for providing a self-reinforcing sealing engagement. Water coming from the water injector will be pressurized within the interstice between the exterior of the capsule and the enclosing member and will eventually arrive at the lip-shaped sealing member. The lip-shaped sealing member will block the water flow as it is biased against the sealing surface of the annular member. This blocking effect will lead to the pressure raising at the upstream-side of the sealing member which in turn will lead to the sealing member being pressed even stronger against the sealing surface and thus to a sealing engagement which is the stronger the higher the pressure at the sealing engagement.

Figure 5:
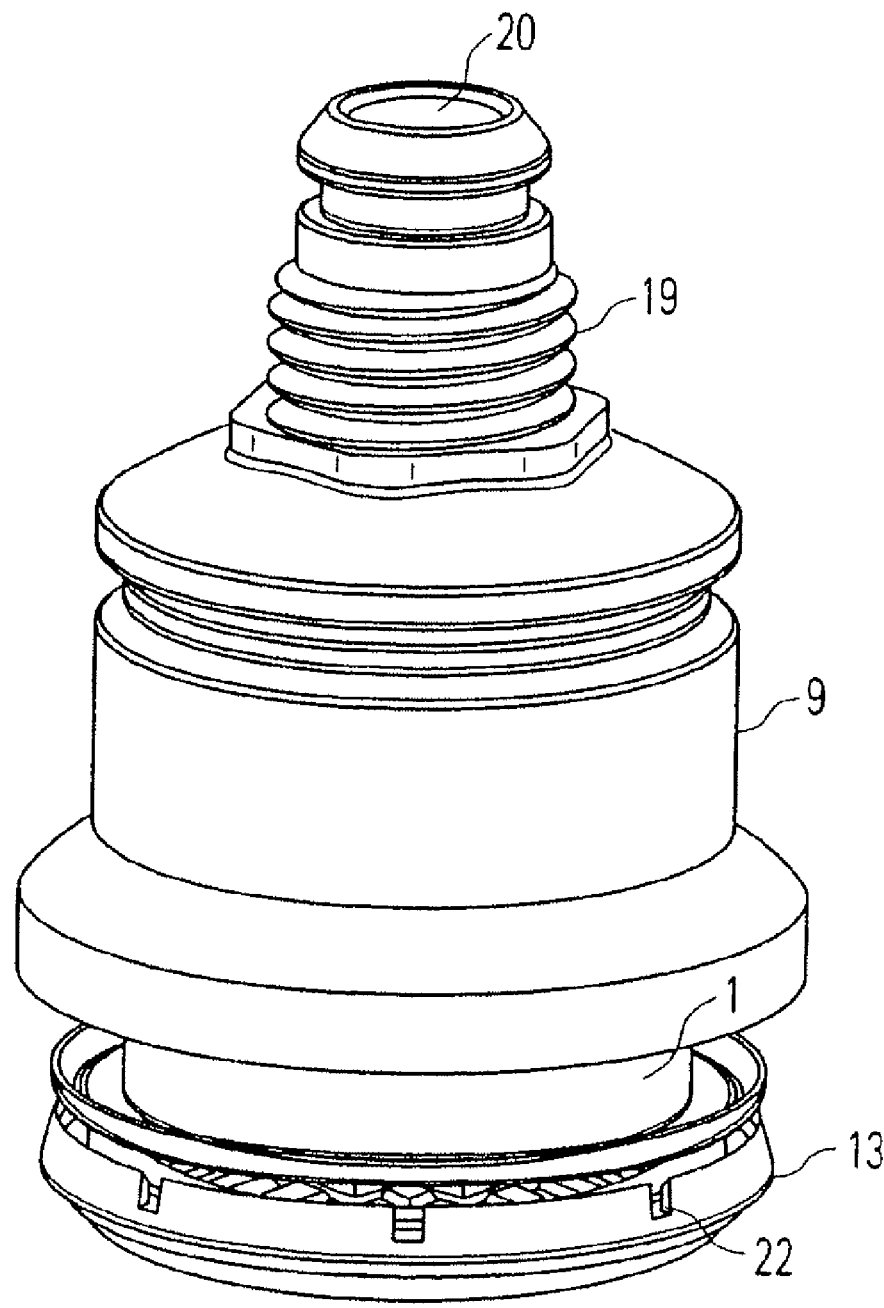
FIG. 5 shows a perspective view of a capsule holder, a bell member and a capsule according to the first embodiment in a position in which the capsule has not yet reached its closing position.

In the embodiment of FIG. 5 grooves 22 are provided in the circumference of capsule holder 13, which grooves 22 act to evacuate water which could settle or accumulate on the upper surface of the capsule holder 13 or dripping out of the capsule before the capsule has been removed. Thus, when seen in a side view as e.g., in FIG. 5, the enclosing member 9 can present circumferential corrugations, with grooves that are shown representing just one example of such corrugations.

The sealing member is designed to compensate/fill such corrugations in the closed state of the enclosing member 9. However, e.g. due to manufacturing tolerances, misalignments, wear or fatigue of the parts of the beverage production device, even without expressively foreseen corrugations there is always a risk of a clearance and/or insufficient tightness of the sealing engagement between the capsule 1 and the enclosing member 9. According to the present invention, the sealing member is compressed sufficiently in order to compensate for any foreseen an/or unforeseen clearance which could exist otherwise.

When seen in a radially sectioned view as e.g., in FIG. 4, the contour of the rim of the enclosing member 9, i.e. the pressing surface, does not present radial corrugations. The radial section of the pressing surface rather presents linear and/or frustroconical sections or a combination thereof. Thus the pressing surface according to the present invention is designed to compress or slightly displace the sealing member.

Figure 6:
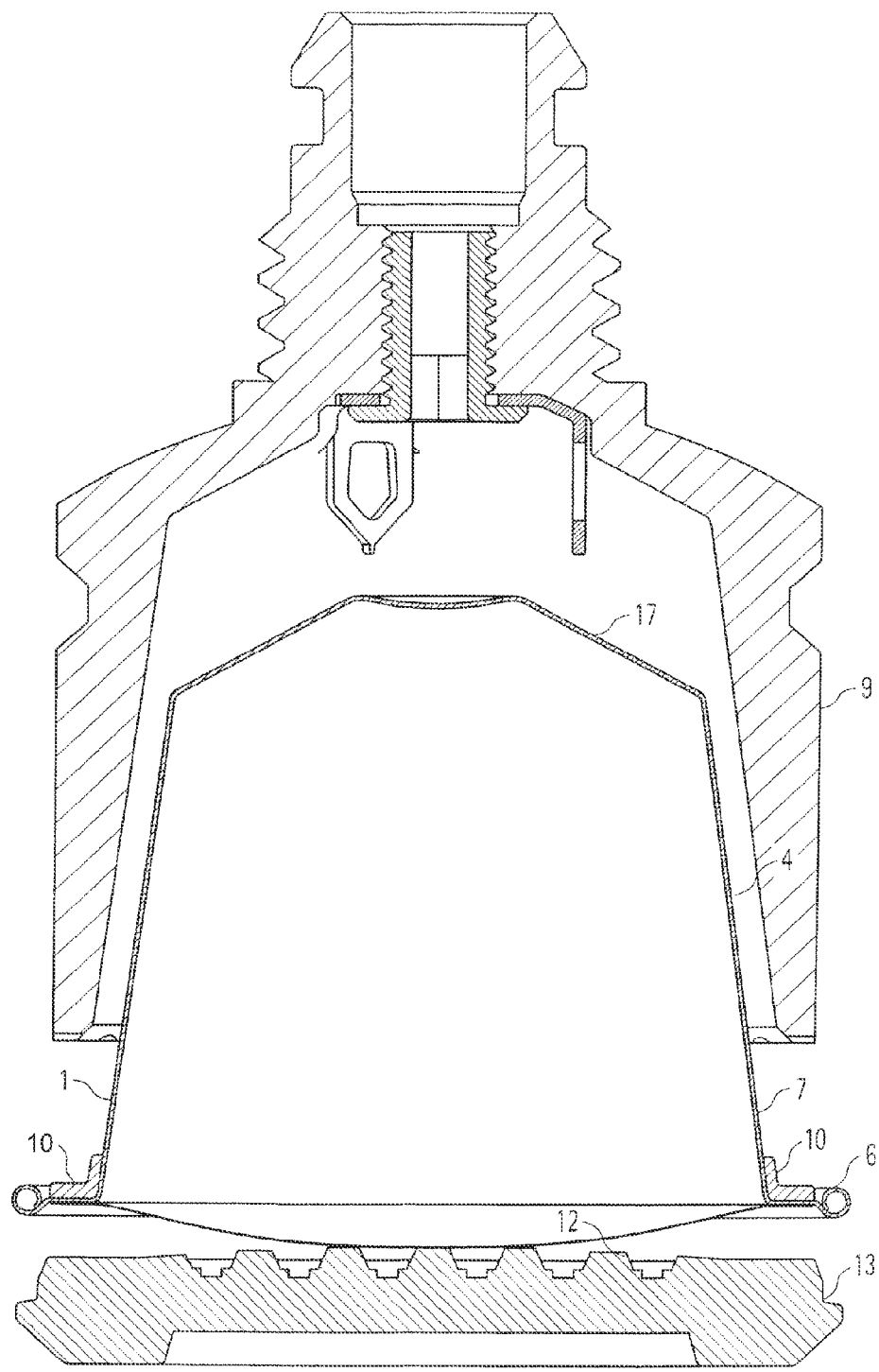
FIG. 6 shows a second embodiment of the present invention.
Figure 7:
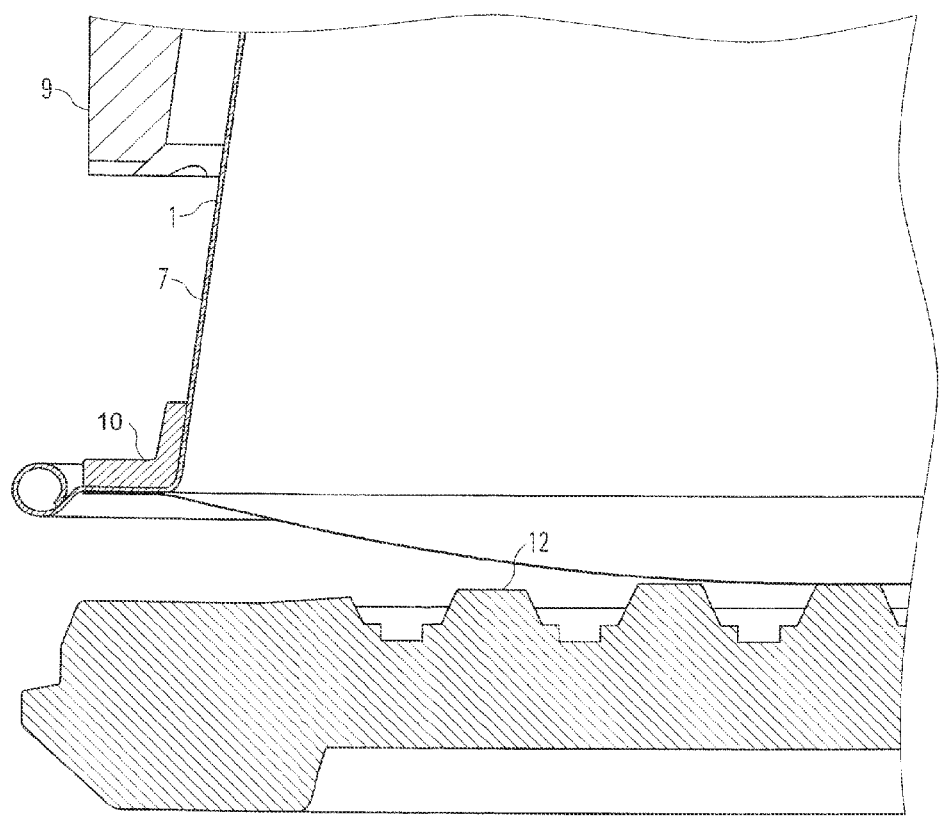
FIG. 7 is an enlarged view of a detail of FIG. 6.

FIG. 6 shows an embodiment essentially corresponding to a variant of the first embodiment of FIG. 2. The sealing member 8 according to this embodiment is compressible and/or displaceable (i.e., it can slightly "flow" when pressurized by the enclosing member). It covers both a portion of the side wall 7 and the area between the outer end of the flange-like rim 6 of the capsule 1 and said side wall 7. (The sealing member can also cover only a portion of the side wall 7 of the base body 4 of the capsule 1.) The sealing member 8 according to this embodiment has a non-symmetrical, i.e. L-shaped cross-section. Alternatively, the sealing member 8 can have other shapes such as e.g. a film applied to the capsule, an O-ring, etc.

Figure 8:
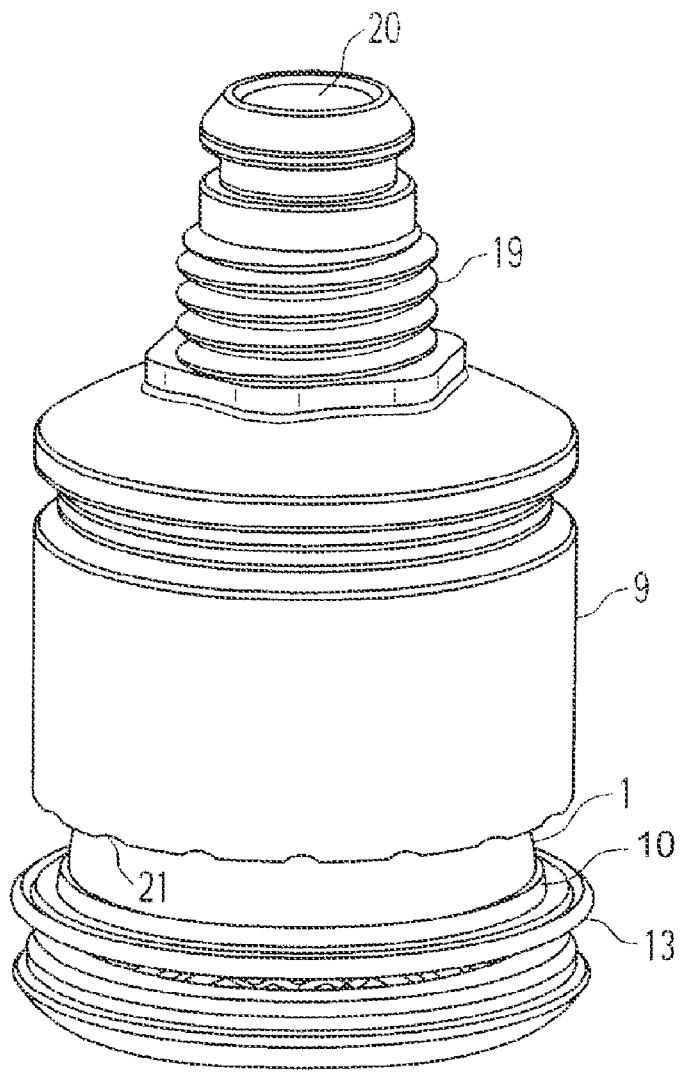
FIG. 8 is a perspective view of the second embodiment.

When the capsule 1 is in a position as shown in FIG. 4 and then, after having finished the beverage production process, the holder 13 is opened, there is a risk that the capsule 1, instead of falling down, remains sucked into the bell member 9 due a "vacuum effect". As shown in FIG. 8 the invention proposes to provide for a mechanism which assures that the type sealing engagement between the capsule 1 and the bell member 9 is only present as long as the bell member 9 is engaged against the capsule holder 13, but automatically released such that air can get into the space between the top wall 17 and the side walls 7 of the capsule 1 and the inner wall of the bell member 9, respectively.

As can also be seen from FIG. 8, especially in case the sealing member 8 covers a portion of the side walls 7 of the capsule 1, the annular front surface of the bell member 9 can be provided with grooves 21 which, act as air inlet passage for feeding air. The grooves allow the intake of air once the biasing force between the bell member 9 and the capsule holder 13 is released. Air is thus flowing into this space and it will be easier for the user to take out the capsule 1. Eventually, the capsule 1 will even automatically fall down from the bell element 9.

Figure 9:
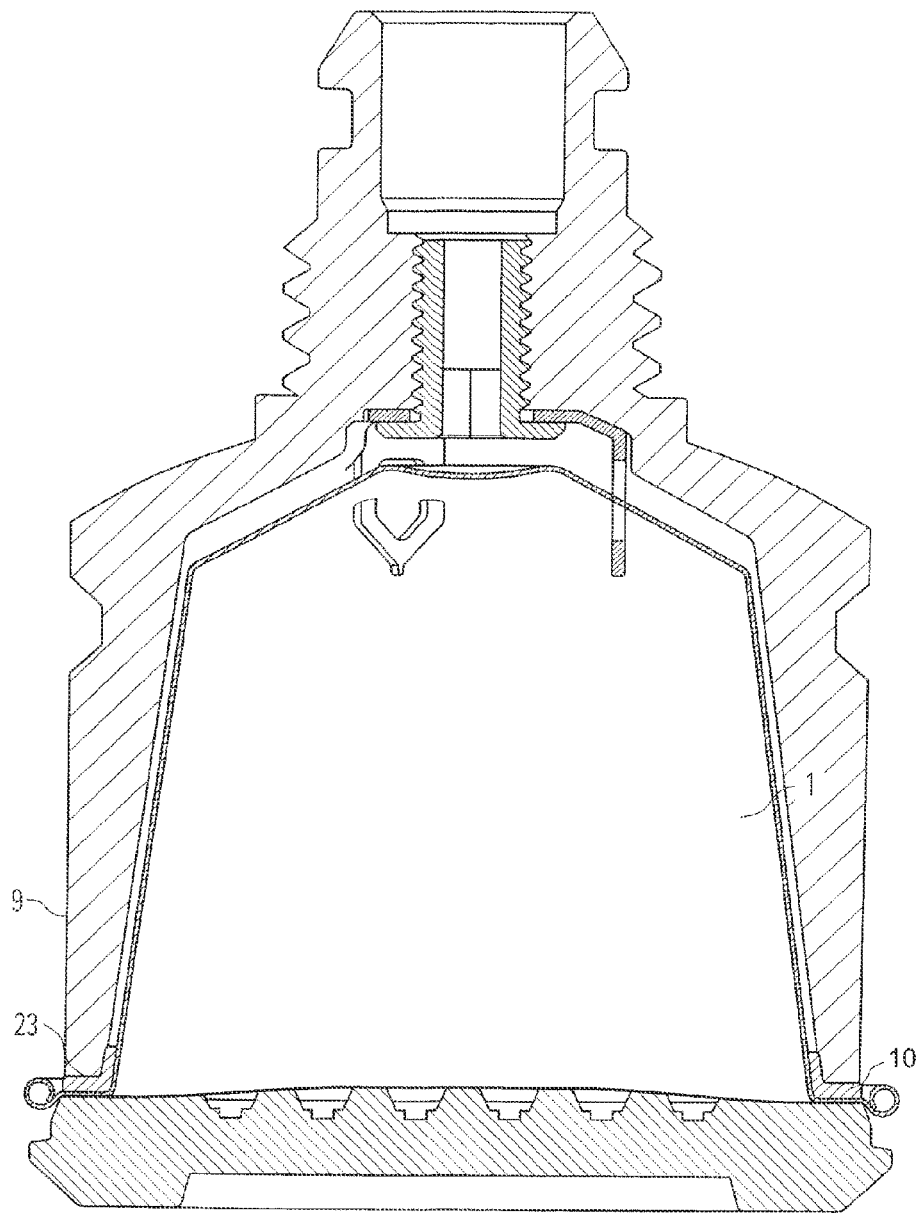
FIG. 9 shows the second embodiment in a state in which the capsule has reached its closing position.

FIG. 9 shows the state of the second embodiment in which the front surface 23 of the bell member 9 is in sealing engagement with the sealing member 8 of the capsule 1.

Figure 10:
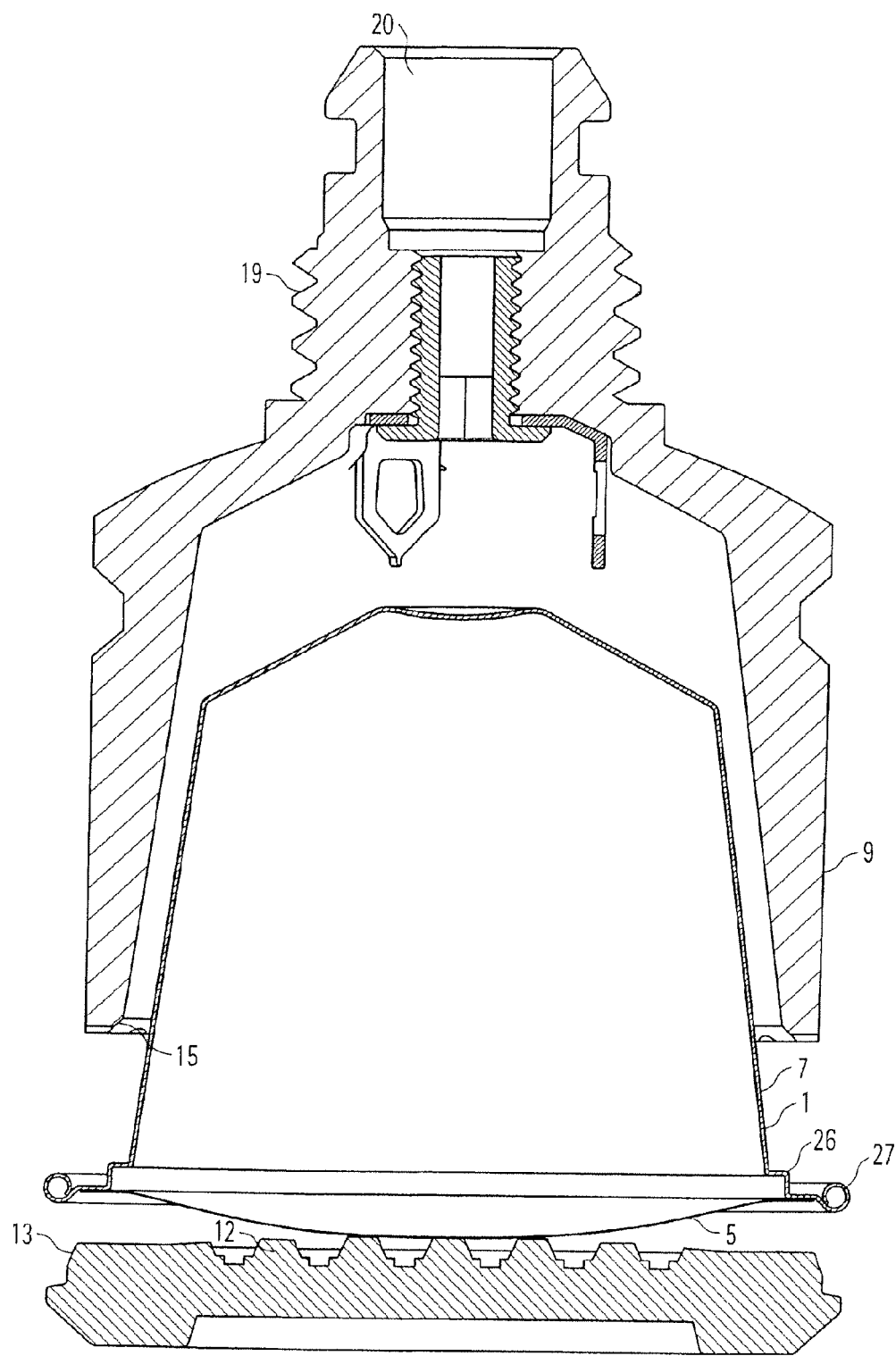
FIG. 10 shows a third embodiment in which the sealing member of the capsule is part of the side wall of the capsule.
Figure 11:
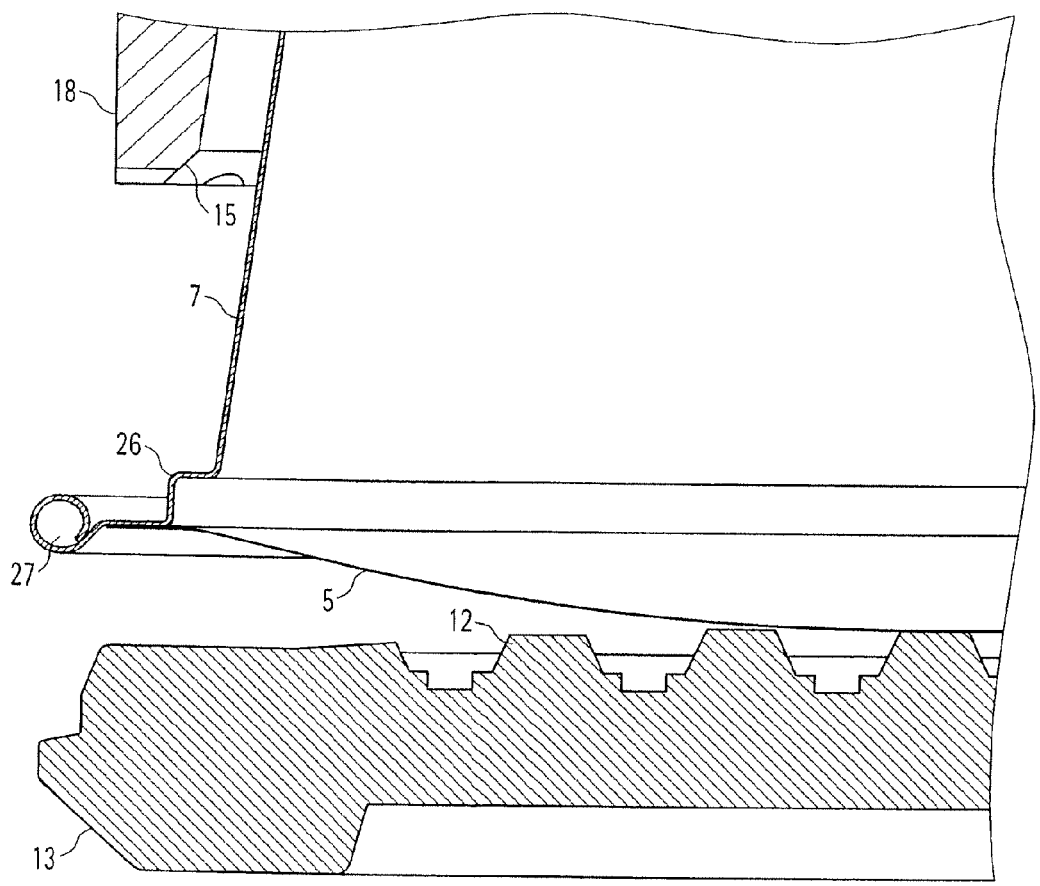
FIG. 11 is a detailed view of FIG. 10.
Figure 12:
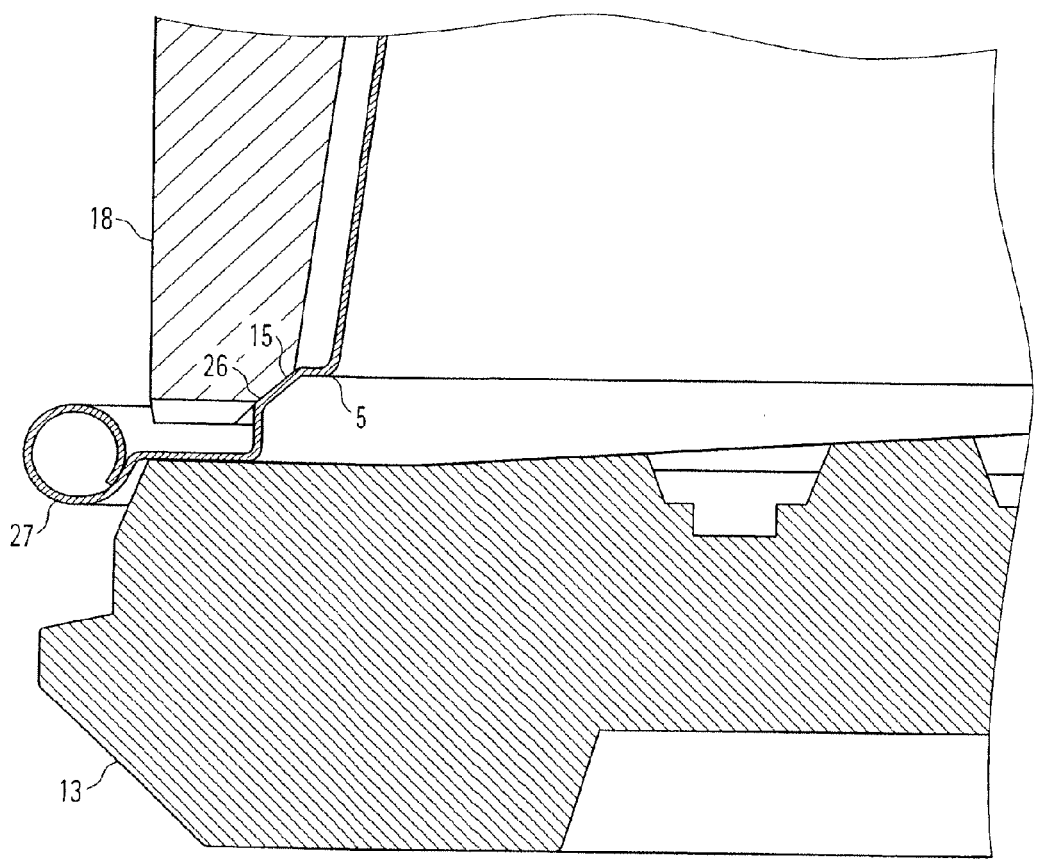
FIG. 12 shows the sealing engagement according to the third embodiment.

FIGS. 10 to 12 show a third embodiment of the present invention in which the resilient nature of the sealing member is due to the geometrical shape of the capsule itself. In the depicted embodiment the sealing member has the shape of a step 26, i.e. a sudden increase of the diameter of the side wall 7 of the capsule 1. Note that the geometrical form is not limited to the shown step and other forms are viable as long as they procure a resilient or at least deformable nature of the sealing member.

The step-like sealing member 26 according to this embodiment is only one example for a hollow sealing member (in contrast e.g. to the "filled" sealing member 8 according to the second embodiment, FIGS. 6 to 9). When the resiliency of the sealing member is procured by the geometrical shape, usually a deflection of the sealing member occurs (here: inwards and downwards deformation of the step). On the other hand, when the resilient nature is due to the material used and a "filled" sealing member is used, usually a compression and/or displacement of the material occurs.

The sealing surface 15 according to this embodiment is inclined. Thus the sealing pressure has a first component being directed radially inside and another component being directed axially (downwards in FIG. 12). As can be seen especially from FIG. 12, the foil member 5 can be wrapped (see reference 27) over the rim of the capsule.

Figure 13:
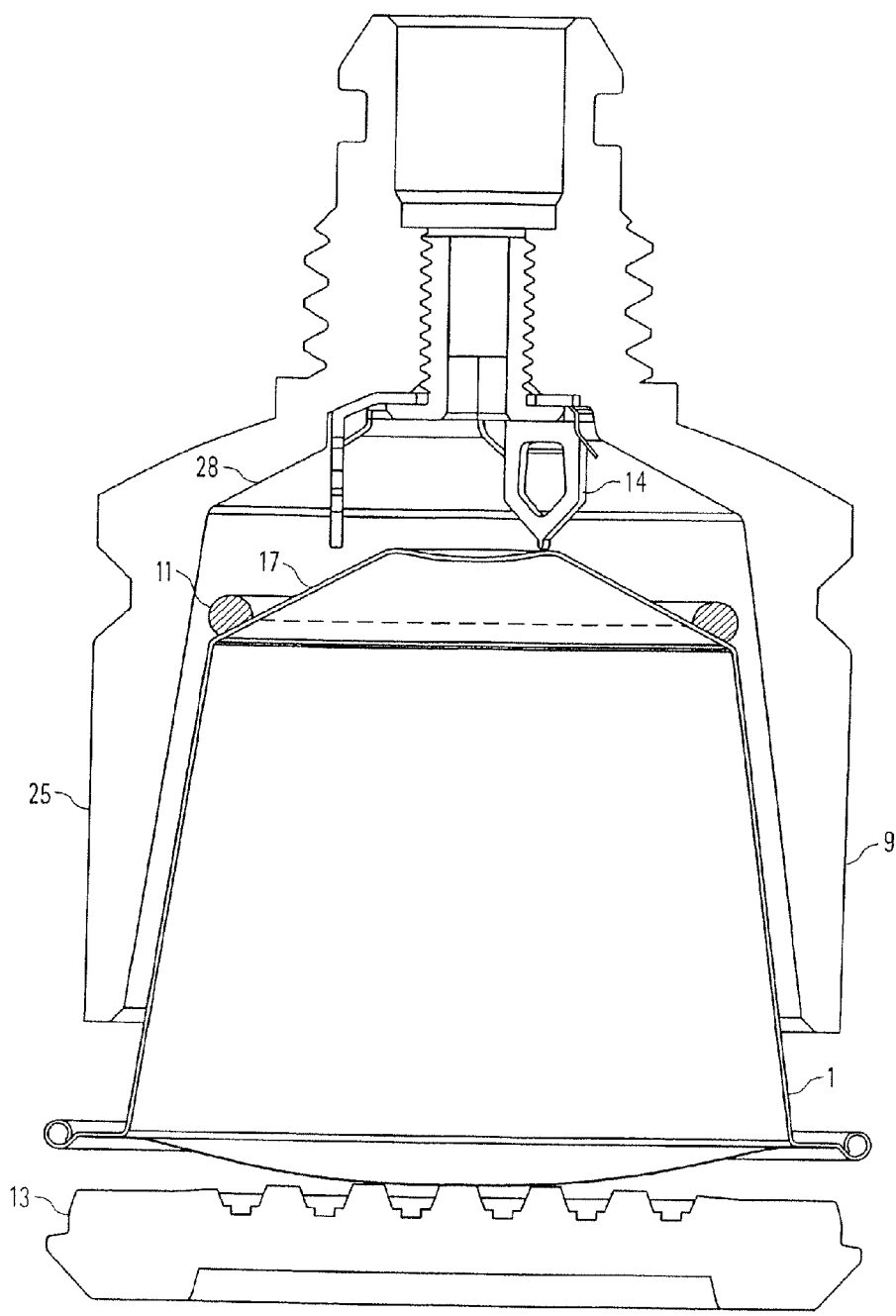
FIG. 13 shows a fourth embodiment in which the sealing member is part of the top wall member of the capsule.
Figure 14:
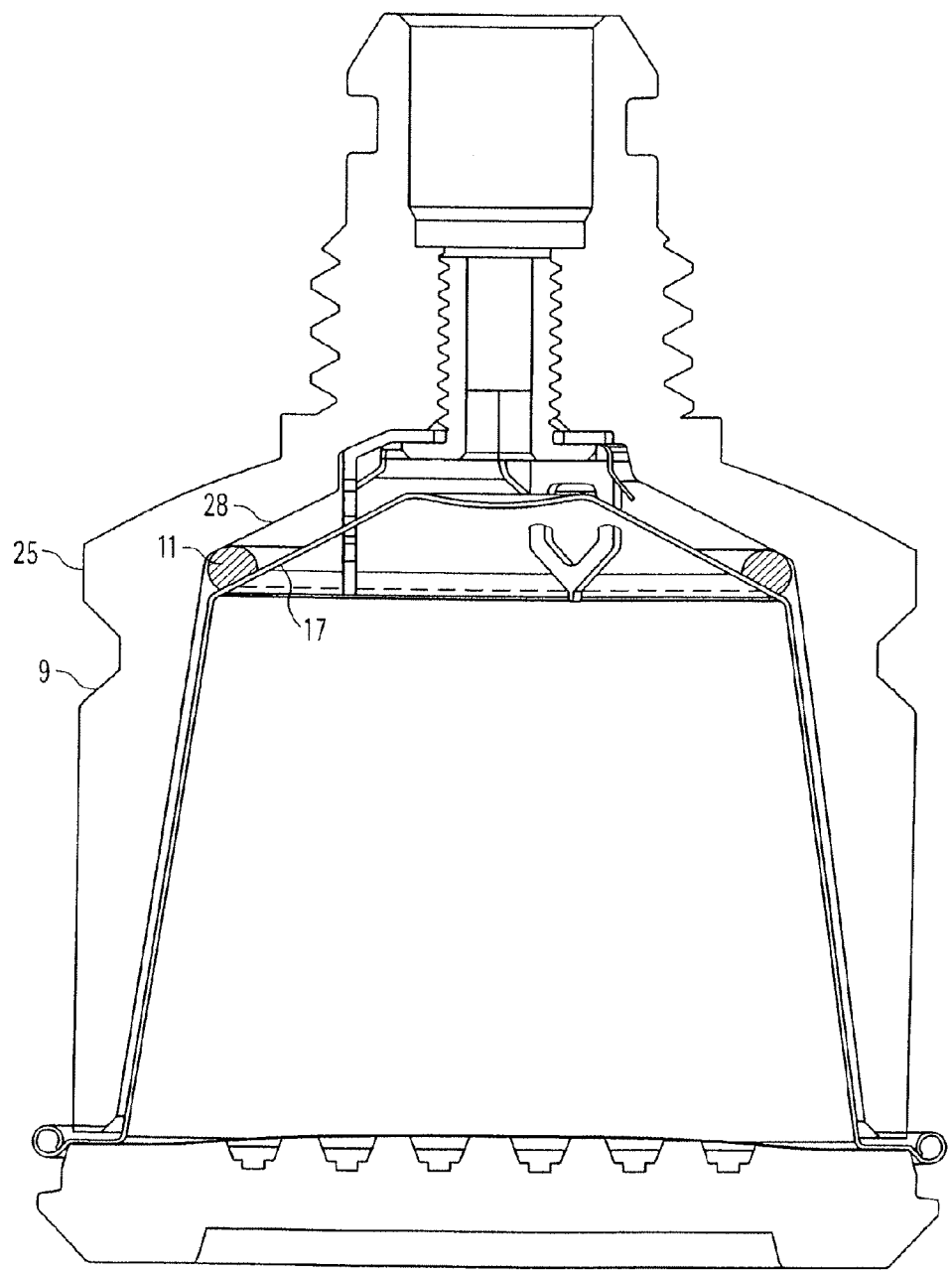
FIG. 14 shows the fourth embodiment in the final state.

FIGS. 13 and 14 show a fourth embodiment in which the sealing member is an O-ring 11. The O-ring is geometrically arranged and, preferably fixed, on the top wall 17 of the capsule 1. This is just an example of providing a sealing member at the exterior of the capsule 1 at the side which faces the water injector and which will be perforated in order to create the water inlets to the capsule 1. The O-ring 11 is positioned to peripherally surround the area in which the water injector 14 perforates the top wall 17 of the capsule 1. The sealing member 11 is thus compressed by the bottom 28 of the enclosing member 9 and (see FIG. 14) secured in place by the upper end of the circumferential side wall 25 of the enclosing member 9.

Note that the bottom 28 can be substantially flat or inclined to ensure a sufficiently water-tight interface with the sealing member 11 when the capsule is fully engaged in the enclosing member 9 at closing of the device. As an alternative to the O-ring 11, also a deflectable lip-like sealing member (e.g. comparable to the lip 8 according to the first embodiment, see FIG. 2) can be placed protruding from the top wall 17 of the capsule 1, i.e. the wall facing the water injector 14. In any case, the bottom 28 will exert an axial compression force on the sealing member 11. In case e.g. an O-ring is placed on the side wall 7 of the capsule 1, the radial component of the compression force will prevail.

What is claimed is:

1. A beverage producing system comprising:
    a capsule containing beverage ingredients and having a center axis; a cup-shaped body comprising a top wall and a sidewall having an outer surface, with the top wall and sidewall configured for defining a cavity that contains beverage forming ingredients therein; and with the sidewall including a rim-like flange forming a periphery of the sidewall, which flange includes transverse and axial extensions and a foil member sealed to the flange of the body to retain the beverage forming ingredients in the cavity;
    a capsule-based beverage producing device provided with a member for injecting a liquid under pressure into the capsule, a member for draining a beverage from the capsule, and an enclosing member that is movable from an opened state to a defined closed state, in which the enclosing member encloses the outer surface of the capsule; and
    a dedicated sealing member which is not part of the foil member and is present both on the rim of the flange opposite the foil member and on part of the outer surface of the sidewall of the body to form part of the capsule, which sealing member is compressible when engaged by the enclosing member in the closed state;
    wherein the sealing member is provided upon the transverse and axial extensions of the flange and extends to and upon the outer surface of the sidewall of the body such that when compressed by the enclosing member in the closed state provides a sealing engagement that compensates for clearances between the enclosing member and the capsule which would otherwise exist when the enclosing member is in its defined closed state such that the sealing member assures that the liquid can only flow through the capsule and in contact with the beverage ingredients to form a liquid beverage.

2. The system according to claim 1, wherein the sealing member is made of a material that is resilient under compression when it is engaged by the enclosing member in the closed state, providing a sealing pressure that has a radial or axial component relative to the center axis of the capsule.

3. The system according to claim 2, wherein the enclosing member and sealing member provide a sealing engagement that withstands a pressure in the range of 2 to 20 bars.

4. The system according to claim 1, wherein the enclosing member is arranged such that during a final phase of its movement from the opened to closed state, it carries out an essentially axial relative movement with regard to the capsule without a relative rotation of the capsule.

5. The system according to claim 1, wherein the enclosing member is arranged with regard to the capsule such that the capsule essentially stays in place during movement of the enclosing member to its defined closed state.

6. The system according to claim 1, wherein the sealing member is made of a compressible material, has the shape of a ring, and has a thickness that extends away from the flange such that the sealing member is exposed and arranged to exert a biasing force against a matching pressing surface of the beverage production device when the sealing member is contacted by the pressing surface so that the sealing member assures that the liquid cannot flow around the capsule.

7. The system according to claim 6, wherein the pressing surface has a linear or frustroconical contour when seen in a radial section view and a non-linear contour when seen in a side view.

8. The system according to claim 1, wherein the sealing member is made of a rubber-elastic material or is made from the same constituent material from which the capsule is made and has the shape of an O-ring or a ring having a L-shaped cross-section.

9. The system according to claim 1, further comprising first and second wall elements connected with each other in an airtight fashion in a flange-like rim area of the capsule in order to create a sealed interior for the capsule ingredients.

10. The system according to claim 9, wherein the sealing member is separate from the flange-like rim and is mounted thereupon.

11. The system according to claim 10, wherein the sealing member is attached to the flange-like rim using an adhesive, by welding, by pinching, by crimping or by any combination of such attachments.

12. The system according to claim 9, wherein the sealing member forms an integral part of the flange-like rim.

13. The system according to claim 1, wherein the sealing member has sufficient resiliency to withstand pressure exerted by the enclosing member on the capsule, and to automatically be released as soon as the pressure is relieved.

14. The system according to claim 1, wherein the enclosing member includes grooves about its circumference which act as air inlet passages for feeding air through the released sealing engagement between the capsule and the enclosing member.

15. The system according to claim 1, wherein the enclosing member comprises additional sealing member adapted to assist in the sealing engagement between the enclosing member and the capsule.

16. A method for producing a beverage using the beverage system of claim 1, which comprises:
    positioning the capsule containing beverage ingredients in the beverage production device,
    moving the enclosing member of the device from the open state to a defined closed state, while in the final phase of movement of the enclosing member engages and bias the sealing means of the capsule, with the sealing member providing a sealing engagement that compensates for clearances between the enclosing member and the capsule which would otherwise exist when the enclosing member is in the closed state; and
    injecting a liquid under pressure into the capsule through at least one opening in a first wall member and having the liquid leave the capsule through at least one opening in a second wall member, such that the sealing member assures that the liquid can only flow through the capsule and in contact with the beverage ingredients to form a liquid beverage.

17. The method according to claim 16, wherein in the final phase of the transfer movement the enclosing member at least partially compresses the sealing member.

18. The method according to claim 16, wherein the enclosing member and the sealing member of the capsule provide a sealing engagement that withstands a pressure in the range of 2 to 20 bars.

19. A beverage producing system comprising:
    a capsule containing beverage ingredients and having a center axis, a cup-shaped body comprising a top wall and a sidewall having an outer surface, with the top wall and sidewall configured for defining a cavity that contains beverage forming ingredients therein; and with the sidewall including a rim-like flange forming a periphery of the sidewall, which flange includes transverse and axial extensions and a foil member sealed to the flange of the body to retain the beverage forming ingredients in the cavity;

a capsule-based beverage producing device provided with a member for injecting a liquid under pressure into the capsule, a member for draining a beverage from the capsule, a capsule holder that supports the capsule, and an enclosing member that has a pressing surface and that is movable relative to the capsule holder from an opened state to a defined closed state in which the enclosing member encloses the outer surface of the capsule, wherein the pressing surface is provided with corrugations; and a dedicated sealing member which is not part of the foil member and is present both on the rim of the flange opposite the foil member and on part of the outer surface of the sidewall of the body to form part of the capsule, which sealing member is made of a rubber-elastic material, has the shape of a ring, is compressible and has a thickness that extends away from the flange and sidewall such that the sealing member is exposed so that it is contacted by the enclosing member when the enclosing member moves to the defined closed state, and further wherein the sealing member is compressed when engaged by the enclosing member in the closed state;

wherein the sealing member is provided upon the transverse and axial extensions of the flange and extends to and upon the outer surface of the sidewall such that when compressed by the enclosing member in the closed state provides a sealing engagement that compensates for clearances between the enclosing member and the capsule which would otherwise exist when the enclosing member is in its defined closed state such that the sealing member assures that the liquid can only flow through but not around the capsule to contact the beverage ingredients to form a liquid beverage in the capsule.

20. A beverage producing system comprising:

a capsule containing beverage-forming ingredients and having a center axis, a cup-like body comprising a top wall and sidewall having an outer surface, a rim-like flange forming a periphery of the body and which includes transverse and axial extensions, and a foil member sealed to the rim-like flange of the body for retaining the beverage ingredients in the body, the capsule further comprising a separate, dedicated sealing member which is not part of the foil member and is attached to the rim of the flange opposite the foil member and onto part of the outer surface of the sidewall of the body to form part of the capsule, which sealing member is made of a rubber-elastic material, has the shape of a ring having a L-shaped cross-section, is compressible and has a thickness that extends away from the flange and sidewall such that the sealing member is exposed so that it is contacted by the enclosing member when the enclosing member moves to the defined closed state, and further wherein the sealing member is compressed when engaged by the enclosing member in the closed state, wherein the sealing member is provided upon the transverse and axial extensions of the flange and extends to and upon the outer surface of the sidewall of the body;

a capsule-based beverage producing device provided with a member for injecting a liquid under pressure into the capsule, a member for draining a beverage from the capsule, and an enclosing member for engaging the capsule in a defined closed state;

wherein the sealing member is compressed when engaged by the enclosing member in the closed state, with the enclosing member being movable from an opened state to the defined closed state, in which the enclosing member engages the capsule in an effective fluidly sealed configuration in which the sealing member compensates for clearances between the enclosing member and the capsule which clearances would otherwise exist without the sealing member of the capsule when the enclosing member is in its defined closed state such that, when compressed by the enclosing member in the closed state, the sealing member assures that the liquid can only flow through but not around the capsule to contact the beverage ingredients to form a liquid beverage in the capsule; and wherein the device comprises a capsule holder having relief elements which are designed to tear the foil member of the capsule as soon as capsule pressure exceeds a threshold value to allow exit of the beverage from the capsule.

21. The system according to claim 20, wherein the sealing member is resilient under compression when it is engaged by the enclosing member in the closed state.

* * * * *